(12) United States Patent
Aldeborg

(10) Patent No.: US 11,440,477 B2
(45) Date of Patent: Sep. 13, 2022

(54) GUIDE RAIL ARRANGEMENT

(71) Applicant: Volvo Car Corporation, Gothenburg (SE)

(72) Inventor: Gert Aldeborg, Uddevalla (SE)

(73) Assignee: Volvo Car Corporation, Gothenburg (SE)

( * ) Notice: Subject to any disclaimer, the term of this patent is extended or adjusted under 35 U.S.C. 154(b) by 884 days.

(21) Appl. No.: 16/274,317

(22) Filed: Feb. 13, 2019

(65) Prior Publication Data
US 2019/0292847 A1    Sep. 26, 2019

(30) Foreign Application Priority Data
Mar. 23, 2018    (EP) .................................... 18163676

(51) Int. Cl.
| | | |
|---|---|---|
| *B60R 5/04* | (2006.01) | |
| *B60R 13/02* | (2006.01) | |
| *E06B 9/58* | (2006.01) | |
| *B60R 22/18* | (2006.01) | |

(52) U.S. Cl.
CPC .............. *B60R 5/045* (2013.01); *B60R 5/047* (2013.01); *B60R 13/0237* (2013.01); *E06B 9/58* (2013.01); *B60R 2022/1818* (2013.01)

(58) Field of Classification Search
CPC . B60R 2022/1818; B60R 5/045; B60R 5/047; B60R 13/0237; E06B 9/58
See application file for complete search history.

(56) References Cited

U.S. PATENT DOCUMENTS

| | | | | |
|---|---|---|---|---|
| 5,149,135 A | * | 9/1992 | Konishi | .................. B60R 22/41 |
| | | | | 280/808 |
| 6,971,677 B2 | * | 12/2005 | Niimi | .................... B60R 22/023 |
| | | | | 280/801.1 |
| 10,427,640 B2 | * | 10/2019 | Vo | .......................... B60R 22/24 |

(Continued)

FOREIGN PATENT DOCUMENTS

| | | |
|---|---|---|
| DE | 4135663 C1 | 11/1992 |
| DE | 10210884 A1 | 10/2003 |
| DE | 102005055188 A1 * | 5/2007 |

(Continued)

OTHER PUBLICATIONS

Machine Tranlation of DE102005055188A1, printed from the EPO website, May 3, 2022.*

(Continued)

*Primary Examiner* — Jason S Morrow
(74) *Attorney, Agent, or Firm* — Clements Bernard Walker; Christopher L. Bernard

(57) ABSTRACT

A guide rail arrangement for an extensible cover. The guide rail arrangement has a main extension direction (D) and comprises a guide rail and a guide member. The guide rail extends in the main extension direction and is adapted to guide the cover during pull-out thereof. The guide member is displaceable in relation to the guide rail, e.g. by sliding or rotation. The guide member is configured to form an extension of the guide rail in the main extension direction, when in an operational position in relation to the guide rail. The present disclosure further relates to a kit comprising the guide rail arrangement and a belt, to a vehicle and to a method of pulling out the extensible cover.

19 Claims, 11 Drawing Sheets

(56) References Cited

U.S. PATENT DOCUMENTS 11,034,222 B2* 6/2021 Quintus .................. B60J 7/102
2020/0331425 A1* 10/2020 Loecherer ............... B60R 22/24

FOREIGN PATENT DOCUMENTS

DE   102019000618 A1 *  6/2019
EP      2033847 A1      3/2009

OTHER PUBLICATIONS

Machine Translation of DE10210884A1, printed from the EPO website, May 3, 2022.*
Machine Translation of DE4135663C1, printed from the EPO webste, May 3, 2022.*
Jul. 6, 2018 European Search Report issue on International Application No. EP18163676.
Jun. 24, 2020 Office Action issued on International Application No. EP18163676.

\* cited by examiner

GUIDE RAIL ARRANGEMENT

CROSS-REFERENCE TO RELATED APPLICATION

The present patent application/patent claims the benefit of priority of co-pending European Patent Application No. 18163676.2, filed on Mar. 23, 2018, and entitled "GUIDE RAIL ARRANGEMENT," the contents of which are incorporated in full by reference herein.

TECHNICAL FIELD

The present disclosure relates a guide rail arrangement for an extensible cover, such as a load cover of a vehicle. The present disclosure further relates to a kit comprising the guide rail arrangement and a belt, to a vehicle and to a method of pulling out the extensible cover.

BACKGROUND ART

Sometimes a cover is provided in a vehicle in order to cover a space, such as a luggage compartment. The cover is typically extensible, i.e. it is configured to be pulled out by hand and/or by a motor. The cover may e.g. be rolled up to a roll or folded up like an accordion, when it is not in use. The cover may be opaque or at least partly transparent. The cover may comprise a fabric and/or a net. Commonly, a guide rail is provided to guide the cover during pull-out.

In some vehicles there may be a belt, such as a safety belt, located in the vehicle luggage compartment, or in whatever space the cover is to cover. The belt is typically located quite close to a lateral side of the vehicle luggage compartment or the space to be covered. The belt is typically attached to the vehicle at one or more belt attachments, e.g. at a seat belt anchor. If pulling the cover straight out, which would be in a rearwards direction for a load cover of the vehicle luggage compartment, the pull-out path of the cover may conflict with the belt, such that the belt would be in the way for the cover being pulled out.

Hence, in some prior art solutions, the belt is released from at least one of the belt attachments, e.g. at a seat belt anchor, in order to pull out the cover, since otherwise the cover would collide with the belt. For such prior art solutions, there could be a risk that that the belt attachment is not properly reinstalled, which may pose a risk when the belt is to be used again.

In other prior art solutions, there is no guide rail provided and, consequently, there is a risk of pulling the cover out in an unsuitable and/or uncontrollable way, e.g. making it difficult to move the cover into an attachment for a pulled-out position of the cover. Moreover, the cover of such a prior art solution might have to be inclined in order to pass the belt, also making it more difficult to pull out the cover properly.

SUMMARY

The object of the present disclosure is to provide an improved guide rail arrangement. Embodiments are set forth in the appended dependent claims, in the following description and in the drawings.

The present invention relates to a guide rail arrangement for an extensible cover, such as a load cover. The guide rail arrangement has a main extension direction and comprises a guide rail and a guide member. The guide rail extends in the main extension direction and is adapted to guide the cover during pull-out thereof. The guide member is displaceable in relation to the guide rail, e.g. by sliding, rotation, folding or rolling, as is further described below. The guide member is configured to form an extension of the guide rail in the main extension direction, when in an operational position in relation to the guide rail.

The cover may be utilized to cover a luggage compartment or another space of a vehicle. The cover is extensible, i.e. it is configured to be pulled out by hand and/or by a motor. The guide rail guides the cover during pull-out, such that the cover is pulled out in a safe and predictable way. When in the operational position, the guide member forms an extension of the guide rail, such that also the guide member guides the cover during pull-out.

By utilizing the guide rail arrangement as described herein, the cover can be pulled out without conflicting with the belt. Hence the belt can remain safely attached to the vehicle also when the cover is pulled out. This differs from some of the above-mentioned prior art solutions, in which the belt is released from at least one of the belt attachments in order to pull out the cover. Further, by providing the guide rail arrangement, it is ascertained that the cover is pulled out in a safe and predictable way.

The guide rail arrangement has a main extension direction, which typically coincides with a longitudinal direction of the vehicle. A suitable material for the guide rail is plastics or metal or a combination thereof.

The guide member may be displaceably attached to the guide rail, or the guide member may be a separate component, which is unattached to, i.e. free from, the guide rail, when not in the operational position. However, generally it is preferred that the guide member is displaceably attached to the guide rail to ascertain that the guide member is available when it is to be used. A suitable material for the guide member is plastics or metal or a combination thereof.

The guide member is preferably located next to the guide rail, when in the operational position, with an intervening distance between the guide member and the guide rail being small, such as at the most 5 mm, more preferably at the most 3 mm, most preferably at the most 1 mm.

The guide member may be displaceable in relation to the guide rail to the operational position from an idle position, in which the guide member is located at the guide rail in an at least partly overlapping position. Preferably, the guide member is displaceable between the idle position and the operational position, such that it can be moved back and forth between the two positions. The guide member may be biased to the idle position, e.g. by means of a spring. There may also be one or more intermediate positions between the idle position and the operational position.

The guide rail may comprise a track intended to receive a protruding member of the cover. The guide member then preferably comprises a corresponding track, such that the guide rail and the guide member are configured to, in the operational position, form a combined track, preferably forming a continuous combined track for receiving the protruding member of the cover. During pull-out of the cover, the protruding member moves in the combined track, e.g. by sliding or rolling in the track.

The protruding member typically protrudes in a lateral direction of the vehicle, when the cover is mounted in the vehicle, the lateral direction being perpendicular to the longitudinal direction of the vehicle. The cover may comprise a pull-bar with the protruding member extending from the end of the pull-bar.

The guide member may be slidably displaceable along the guide rail to the operational position, preferably such that the guide member may be slid between the idle position and the operational position. In that case, the guide member is preferably shaped, such that it can easily slide on top of the guide rail, by means of a rear side of the guide member sliding along a front side of the guide rail, wherein "on top of" corresponds to laterally side by side when the guide rail arrangement is mounted in the vehicle. The sliding in that case typically may comprise a linear translational displacement along the guide rail followed by a short lateral displacement, when the end of the guide rail is reached.

As an alternative or a complement to the sliding displacement, the guide member may be rotatably displaceable in relation to the guide rail to the operational position, preferably such that the guide member is rotated between the idle position and the operational position. In that case, there may be an axis, such as a shaft, around which the guide member rotates. The axis may extend in a height direction being perpendicular to the longitudinal and lateral directions of the vehicle, when the guide rail arrangement is mounted in the vehicle. The axis may be comprised in the guide member or may form a separate component attached to the guide member. The rotation angle of the guide member depends on the relative locations of the idle position and the operational position. Typically, the guide member is rotated about 180 degrees from the idle position to the operational position, in case the guide member is at, on or adjacent to the guide rail in the idle position.

A rotatable guide member may be able to catch a belt being located further away from the guide rail than a slidable guide member, since an outer end of the rotatable guide member will reach laterally further away from the guide rail than an outer end of a sliding guide member, with the outer end being defined as the end furthest away from the guide rail when the guide member is the operational position.

As yet an alternative or a complement, the guide member may be folded or rolled in relation to the guide rail to reach the operational position. In that case, the guide member may be folded like an accordion or be rolled up in the idle position.

The displacement of the guide member to the operational position may combine one or more displacements of sliding, rotation, folding and rolling.

The guide member may comprise a belt catch member, adapted to catch and retain a belt, such as a safety belt, e.g. the belt mentioned above. In order to facilitate pushing of the belt out of the pull-out path of the cover, the rear side of the guide member may, as an option, comprise a belt catch member, e.g. a protrusion, an arm, a hook or a high-friction zone, which prevents the belt from sliding against the rear side of the guide member, once the rear side of the guide member has reached the belt and the belt has been caught by the belt catch member. Thereby, it is ascertained that the belt follows the displacement movement of the guide member and does not slip away from the guide member.

The guide member may have an extension, as seen in the main extension direction, in the range of from 2 cm to 30 cm, preferably 3 cm to 20 cm, more preferably 4 cm to 15 cm. The guide member is thereby preferably at least as wide as the belt the guide member is to cover. The height of the guide member may preferable be the same or substantially the same as for the guide rail.

Alternatively, the guide member may have an extension, as seen in the main extension direction, being much longer than the width of the belt, e.g. longer than 15 cm, 20 cm or 30 cm. In that case, the guide member is typically displaceable in relation to the guide rail by sliding. In the operational position, the guide member in that case partly covers the guide rail. As an option, the guide member may be as long as, or substantially as long as, the guide rail.

The guide rail arrangement may further comprise an additional guide rail, also extending in the main extension direction, such that the additional guide rail is aligned with the guide rail with an interspace therebetween. In that case, the operational position of the guide member is located between the additional guide rail and the guide rail, such that the guide member at least partly fills or covers the interspace to form an extension of the guide rail and the additional guide rail in the main extension direction. A suitable material for the additional guide rail is plastics or metal or a combination thereof.

The guide rail and the optional additional guide rail in that case both extend in the main extension direction and are both adapted to together with the guide member guide the cover during pull-out thereof. The guide member then at least partly fills or covers the interspace between the guide rail and the additional guide rail, when in the operational position. Also the additional guide rail may comprise a track, corresponding to those of the guide rail and the guide member mentioned above, forming a combined track in the operational position of the guide member. Thereby, it is preferred that a continuous combined track is formed by the guide rail, the guide member and the additional guide rail. The displacements of the guide member relative to the guide rail described herein, may as an alternative or a complement be performed in relation to the optional additional guide rail. Further, the additional guide rail may itself be displaceable in relation to the guide rail, e.g. by one or more displacements of sliding, rotation, folding or rolling.

Preferably, the guide member is dimensioned such that it exactly fits, or substantially exactly fits, into the interspace between the guide rail and the additional guide rail, when in the operational position. Thereby an intervening distance is small, such as at the most 5 mm, more preferably at the most 3 mm, most preferably at the most 1 mm.

As an option, the guide member and the additional guide rail may be formed as an integral component, which is displaceable as a whole to reach the operational position. This may also be regarded as a long guide member. When in the idle position, the above-mentioned interspace is formed between the guide rail and the integral component. In the operational position, the integral component at least partly covers that interspace, e.g. by having been slid over the interspace.

The guide rail arrangement may further comprise a displacement means adapted to displace the guide member to the operational position. The guide member may be configured to be moved from the idle position to the operational position by means of the displacement means. The displacement means may comprise, or be constituted by, an electrical means, a mechanical means and/or an electromechanical means, such as an electrical motor or a pretensioned spring being released by a movable pin. The displacement means may also be used to move the guide member back to the idle position, e.g. after the cover has been rolled up or folded and the belt potentially is to be utilized again. The displacement means may be activated by means of a control system of the vehicle, e.g. such that a driver can activate the displacement means from the driving seat, by means of a remote control, e.g. incorporated in a key device or by a switch in the luggage compartment. As an alternative or a complement, the cover itself may activate the displacement means, e.g. by the cover passing a switch when being pulled out, e.g. an electrical, a mechanical and/or an electromechanical switch.

As an alternative or a complement to the displacement means, the guide member may be displaceable by hand to the operational position, preferably between the idle position and the operational position.

The guide rail arrangement may further comprise a side trim panel, e.g. an upper side trim panel, with the guide rail and/or the optional additional guide rail being comprised in the side trim panel or forming a part of the side trim panel. As an alternative, the side trim panel may comprise a slot adapted to receive and hold the guide rail and/or the optional additional guide rail. The side trim panel comprises an indentation, which is located next to the guide rail, such that the guide member in the operational position at least partly covers the indentation. When the guide member is not in the operational position, e.g. in the idle position, there is access to the indentation, such that the belt may be placed in the indentation. When the belt is in the indentation, it can be covered by the guide member, such that it is ascertained that the belt is out of the way of the pull-out path of the cover.

The present invention also relates to a kit comprising the guide rail arrangement and a belt, such as a safety belt, wherein the indentation is configured such that when the belt is placed in the indentation, the guide member in the operational position at least partly covers the belt.

The normal position of the belt is outside the indentation, however, in such a position that the pull-out path of the cover would conflict with the belt. However, by utilizing the kit according to the invention, the cover can be pulled out while keeping the belt out of the way. Thereby, the belt may remain safely attached to the vehicle at the belt attachments, which differs from some prior art solutions, as described above.

If the belt is positioned in an unfavourable position, when the cover is to be pulled out, e.g. interspaced from the side trim panel/s of the vehicle, it may be advantageous to use a belt retaining member to retain the belt in a suitable position, while the guide member is displaced to the operational position. In particular, this may be advantageous for embodiments, in which the guide member is slid during the displacement to the operational position.

The belt retaining member is typically attached to the side trim panel in the proximity to the above-mentioned indentation, e.g. just above or just below the indentation. The belt retaining member may e.g. comprise a hook-shaped member configured to allow the belt to be moved into the belt retaining member and to thereafter retain the belt in the indentation, such that the belt is held out of the way, when the guide member is displaced to the operational position.

The belt retaining member may be manually operated. As an alternative, the belt retaining member may be activated by means of a control system of the vehicle, e.g. such that a driver can activate the belt retaining member from the driving seat, by means of a remote control, e.g. incorporated in a key device or by a switch in the luggage compartment. As yet an alternative or complement, the cover may activate the belt retaining member, e.g. by the cover passing a switch when being pulled out, e.g. an electrical, a mechanical and/or an electromechanical switch. As a further alternative, the guide member itself may activate the belt retaining member, e.g. by the guide member passing a switch when being displaced, e.g. an electrical, a mechanical and/or an electromechanical switch.

The belt retaining member may be rotatably attached to the side trim panel and operate in a similar way as the belt catch member described herein. As an alternative or a complement, the belt retaining member may be releasably attached to the side trim panel and re-attachable to the side trim panel, e.g. by means of a snap-in function.

It would also be feasible to have a self-positioning belt. As yet an alternative, the belt may be placed and held manually in the indentation and/or behind the guide member.

The present invention further relates to a vehicle, such as a passenger car, comprising the guide rail arrangement, or the kit described herein and the cover as described herein. In that case, the cover may be the load cover of the luggage compartment.

The present invention, in addition, relates to a method of pulling out an extensible cover of a vehicle, such as a load cover. The vehicle comprises the kit as described herein and the cover as described herein. The cover comprises a protruding member configured to be moved in the guide rail arrangement, e.g. by sliding, while the cover is pulled out. The method comprises: a) placing the belt in the indentation, b) displacing the guide member to the operational position, and c) pulling out the cover, such that the protruding member moves in the guide rail and in the guide member, respectively.

If the guide rail arrangement comprises the optional additional guide rail described herein, the cover is pulled out, such that the protruding member moves in the additional guide rail as well during step c).

In case the guide member comprises the belt catch member described herein, adapted to catch and retain the belt, step a) may comprise—catching the belt by means of the belt catch member or the belt retaining member in order to place the belt into the indentation.

In case the belt retaining member described herein is provided, step a) may comprise—moving the belt into the belt retaining member in order to retain the belt in the indentation.

BRIEF DESCRIPTION OF THE DRAWINGS

The present invention will hereinafter be further explained by means of non-limiting examples with reference to the appended drawings wherein.

It should be noted that the appended drawings are schematic and that individual components are not necessarily drawn to scale and that the dimensions of some features of the present invention may have been exaggerated for the sake of clarity.

DESCRIPTION OF EMBODIMENTS

The invention will, in the following, be exemplified by embodiments. It should however be realized that the embodiments are included in order to explain principles of the invention and not to limit the scope of the invention, as defined by the appended claims. A feature from one embodiment may be combined with one or more features of any other embodiment.

Figure 1:
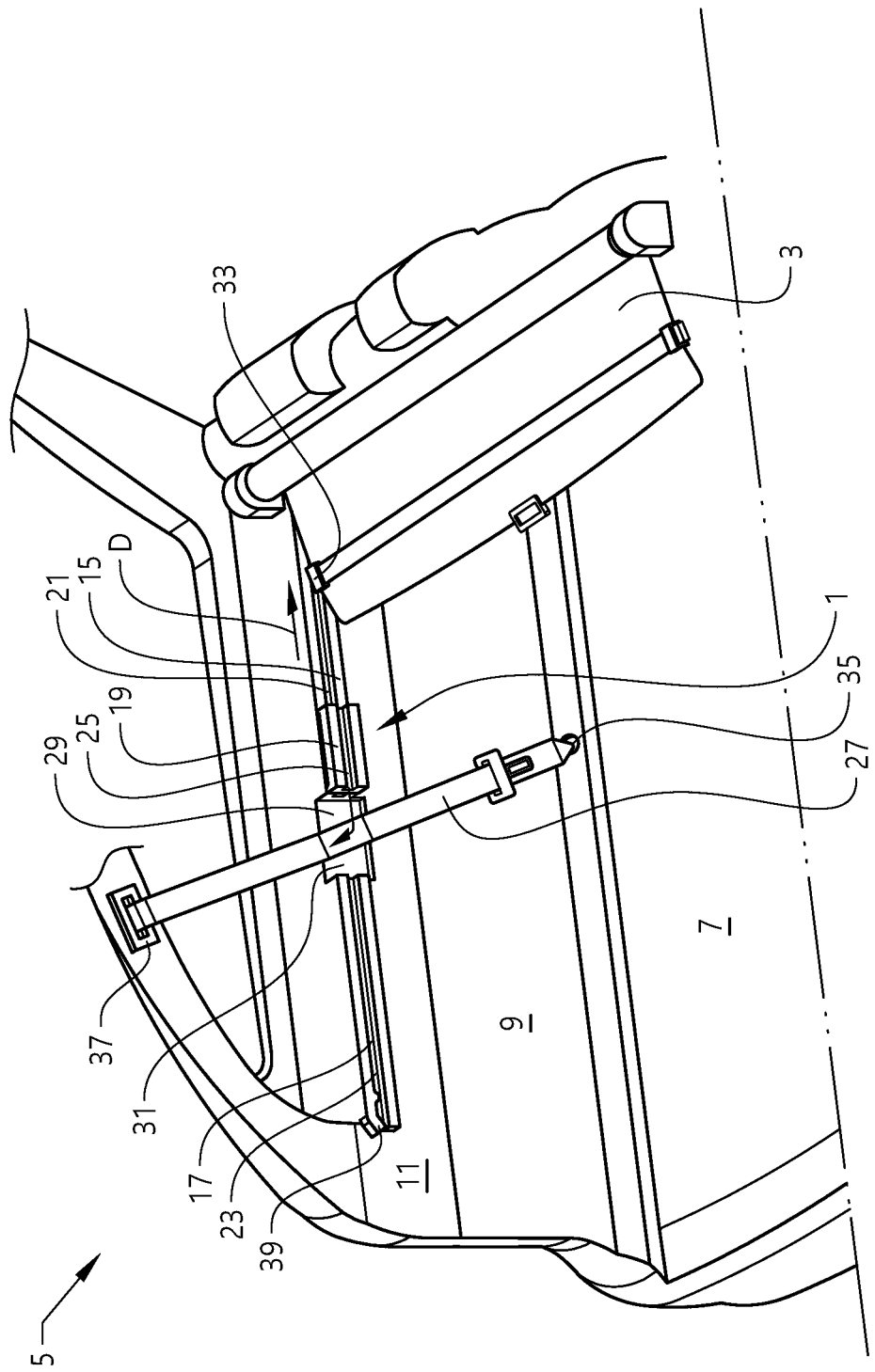
FIG. 1 illustrates a guide rail arrangement according to a first embodiment of the invention with a guide member in an idle position.
Figure 2:
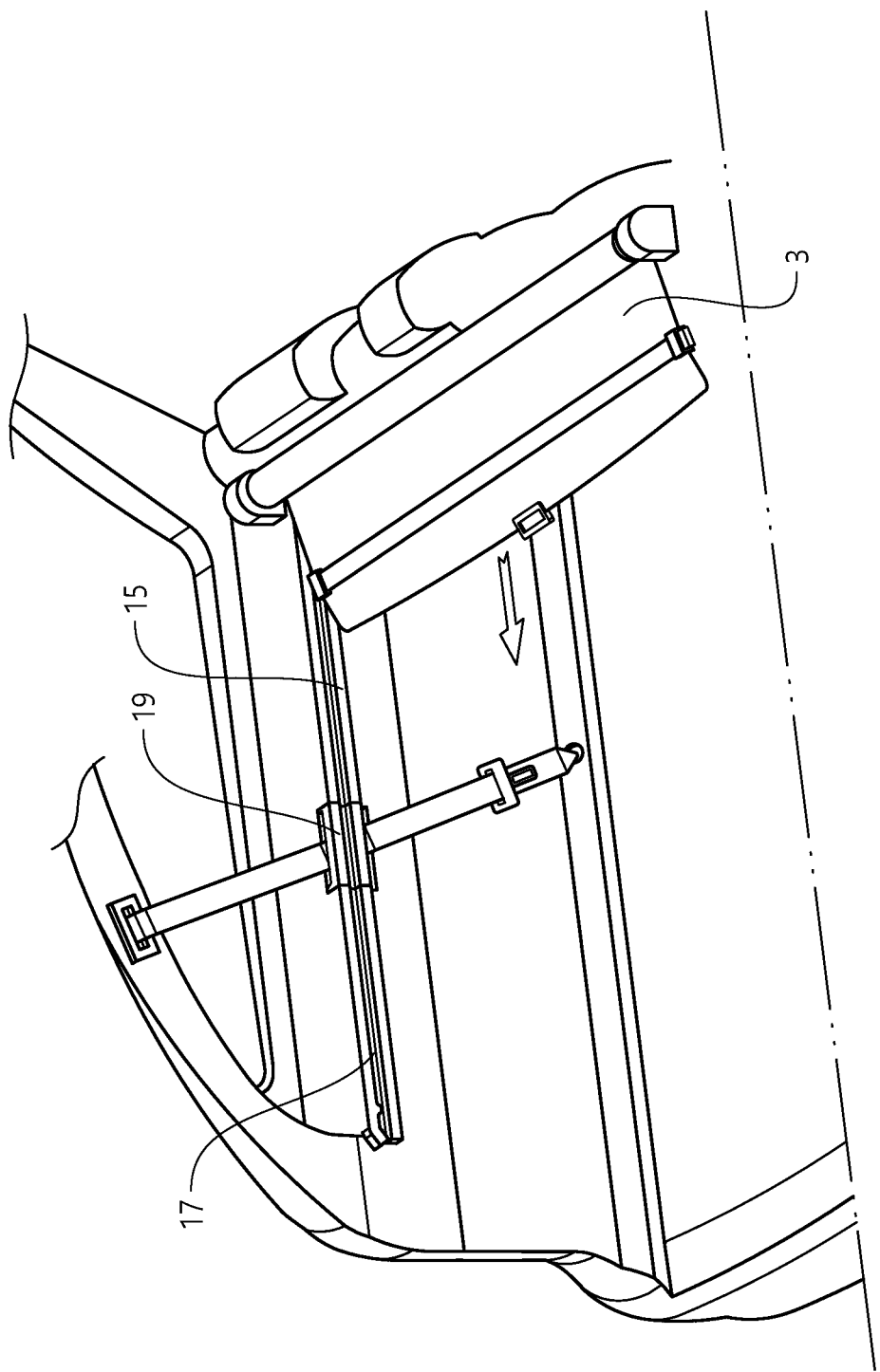
FIG. 2 illustrates the guide rail arrangement of FIG. 1 with the guide member in an operational position.
Figure 3:
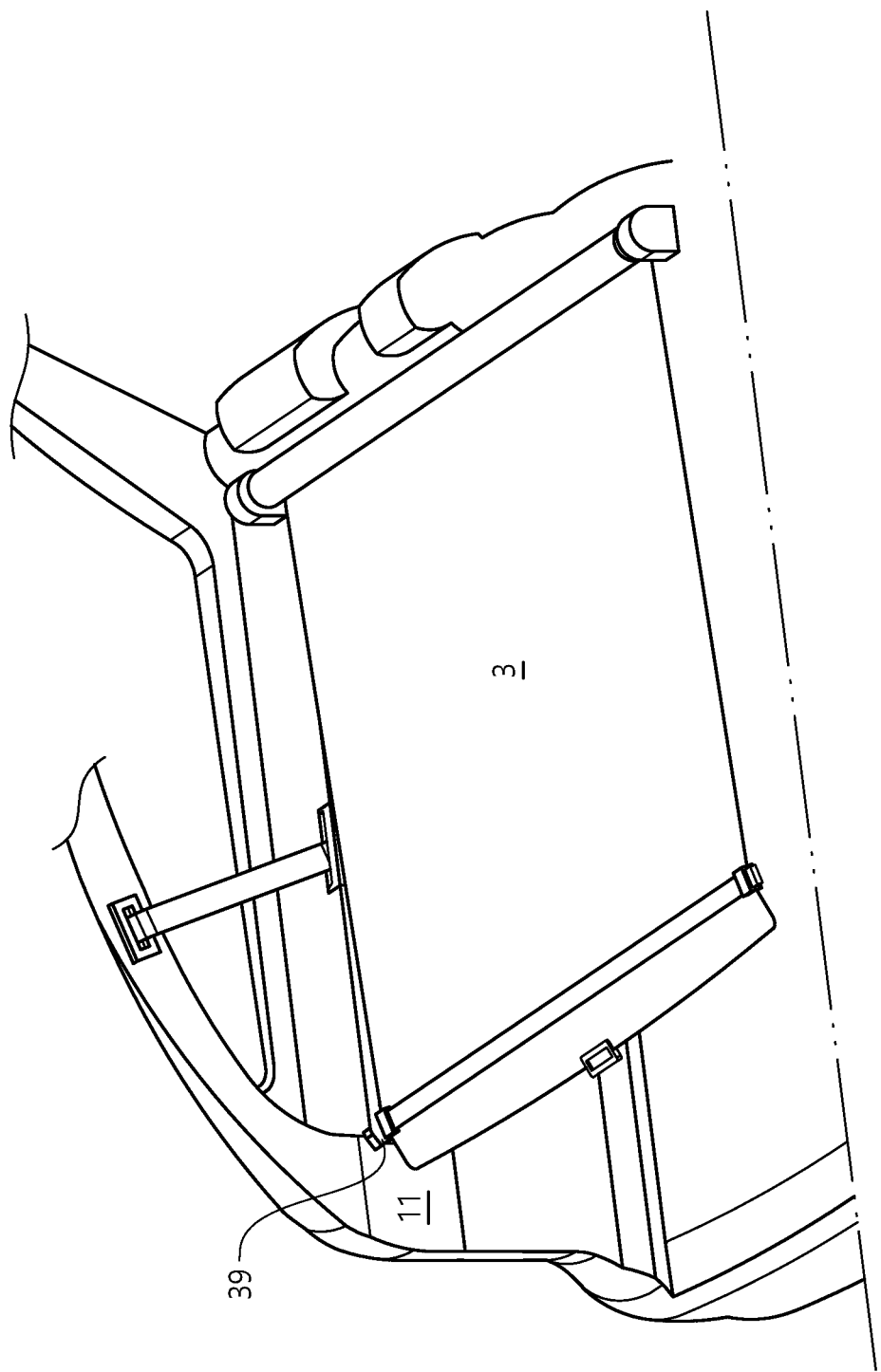
FIG. 3 illustrates the guide rail arrangement of FIG. 1 with pulled-out load cover.

FIGS. 1-3 illustrate a guide rail arrangement 1 for an extensible load cover 3 in a vehicle 5 according to a first embodiment. The guide rail arrangement 1 has a main extension direction D, which typically coincides with a longitudinal direction of the vehicle 5. The vehicle luggage compartment 7 comprises a lower side trim panel 9 and an upper side trim panel 11. Although FIGS. 1-3 only show one lateral side of the vehicle luggage compartment 7, the skilled person understands that there is typically a similar guide rail arrangement at the other lateral side of the vehicle luggage compartment 7.

The guide rail arrangement 1 is comprised in the upper side trim panel 11. The guide rail arrangement 1 comprises a guide rail 15, an additional guide rail 17 and a guide member 19. The guide rail 15 and the additional guide rail 17 extend in the main extension direction D and are adapted to guide the load cover 3 during pull-out thereof in a track 21 located in the guide rail 15 and in a track 23 located in the additional guide rail 17. The tracks 21, 23 are aligned with each other and extend in the main extension direction D. The guide member 19 is displaceable in relation to the guide rail 15, which is further described below. The guide member 19 is shaped to be able to form an extension of the guide rail 15 in the main extension direction D, when in an operational position in relation to the guide rail 15. Therefore, also the guide member 19 comprises a corresponding track 25.

A belt 27, illustrated as a rear safety belt, is located in the vehicle luggage compartment 7, quite close to a lateral side of the vehicle luggage compartment 7. If pulling the load cover 3 out straight rearwards, the pull-out path of the load cover 3 would conflict with the belt 27, such that the belt 27 would be in the way, a problem which is solved by the invention disclosed herein.

According to the invention, the upper side trim panel 11 comprises an indentation 29 configured to receive the belt 27. The indentation 29 is thus deep enough to be able to contain the belt 27. The indentation 29 is located at a position corresponding to an interspace 31 between the guide rail 15 and the additional guide rail 17. Due to the interspace 31 between the guide rail 15 and the additional guide rail 17, it is possible to move the belt 27 into the indentation 29 such that the belt 27 can assume a lateral position not interfering with the pull-out path of the load cover 3.

As mentioned above, the guide member 19 is displaceable in relation to the guide rail 15. Thereby, the guide member 19 may be slidably displaced between an idle position, in which there is access to the indentation 29, see FIG. 1, and an operational position, in which the guide member 19 forms an extension of the guide rail 15 by covering the indentation 29, see FIG. 3. FIG. 3 illustrates a pulled-out load cover 3 with the guide member 19 in the operational position. The guide member 19 is preferably biased to its idle position, e.g. by means of a spring, not illustrated.

In the idle position, the guide member 19, is located at the guide rail 15 in an overlapping position, see FIG. 1. In the illustrated embodiment, the guide member 19 is shaped such that it can easily slide on top of the guide rail 15, by means of a rear side of the guide member 19 sliding along a front side of the guide rail 15, as is indicated by the bent arrow of FIG. 1. The guide member 19 slides along the guide rail 15 until it reaches the interspace 31 and then moves laterally into the interspace 31, i.e. in a direction being perpendicular to the main extension direction D.

As an alternative, not illustrated, the guide member 19 may instead assume its idle position in an overlapping position with the additional guide rail 17 and thus slide along the additional guide rail 17 to the operational position.

When the guide member 19 reaches the operational position after having been slid along the guide rail 15, see FIG. 2, it fits into the interspace 31 between the guide rail 15 and the additional guide rail 17. A front side of the guide member 19, i.e. the side facing the vehicle luggage compartment 7, is shaped such that the guide member 19 forms an extension of the guide rail 15. As mentioned above, the guide member 19 comprises the track 25 corresponding to the tracks 21, 23 of the guide rails 15, 17. Preferably, and as is illustrated, the guide member 19 fills or covers the interspace 31, such that a continuous combined track is obtained of the tracks 21, 23, 25 when the guide member 19 is in the operational position. Preferably, and as is illustrated, the combined track is continuous all the way from a not-in-use position of the load cover 3, see FIG. 1, to the pulled-out position of the load cover 3, see FIG. 2.

The load cover 3 comprises a protruding member 33, which fits in the tracks 21, 23, 25. Hence, when the load cover 3 is pulled out, the protruding member 33 slides in the combined track formed by the tracks 21, 23, 25, which ascertains that the load cover 3 follows the desired pull-out path in a safe way without risking leaving the tracks 21, 23, 25. The belt 27 is held out of the way of the pull-out path of the load cover 3, since the belt 27 is positioned in the indentation 29 and covered by the guide member 19. The guide member 19 ascertains that the belt 27 is retained in the indentation 29. Hence, the protruding member 33 of the load cover 3 can easily pass the belt 27. Yet, the belt 27 is attached to the vehicle 5 in a safe way by belt attachments 35, 37.

FIG. 3 shows the load cover 3 in the pulled-out position. The track 23 of the additional guide rail 17 comprises a shaped end portion 39 forming an attachment for the protruding member 33 of the load cover 3 in the pulled-out position of the load cover 3, which can also be seen in FIGS. 1 and 2.

By utilizing a guide rail arrangement 1 according to the invention, the load cover 3 can thus be pulled out while keeping the belt 27 safely attached to the vehicle 5 at the belt attachments 35, 37.

The guide member 19 may be moved from the idle position to the operational position by means of a displacement means, not illustrated, e.g. an electrical means, a mechanical means and/or an electromechanical means, such as an electrical motor or a pretensioned spring being released. The displacement means may also be used to move the guide member 19 back to the idle position when the load cover 3 is rolled up and the belt 27 is to be utilized. The guide member 19 is then slid back along the guide rail 15 or along the additional guide rail 17 to reach the idle position.

As an alternative, or a complement, the guide member 19 may be moved by hand between the idle position and the operational position.

The guide member 19 has an extension, as seen in the main extension direction D, in the range of from 2 cm to 30 cm, preferably 3 cm to 20 cm, more preferably 4 cm to 15 cm. The guide member 19 is thereby at least as wide as the belt 27 the guide member 19 is to cover. The height of the guide member 19 may preferably be the same or substantially the same as for the guide rail 15.

Figure 4:
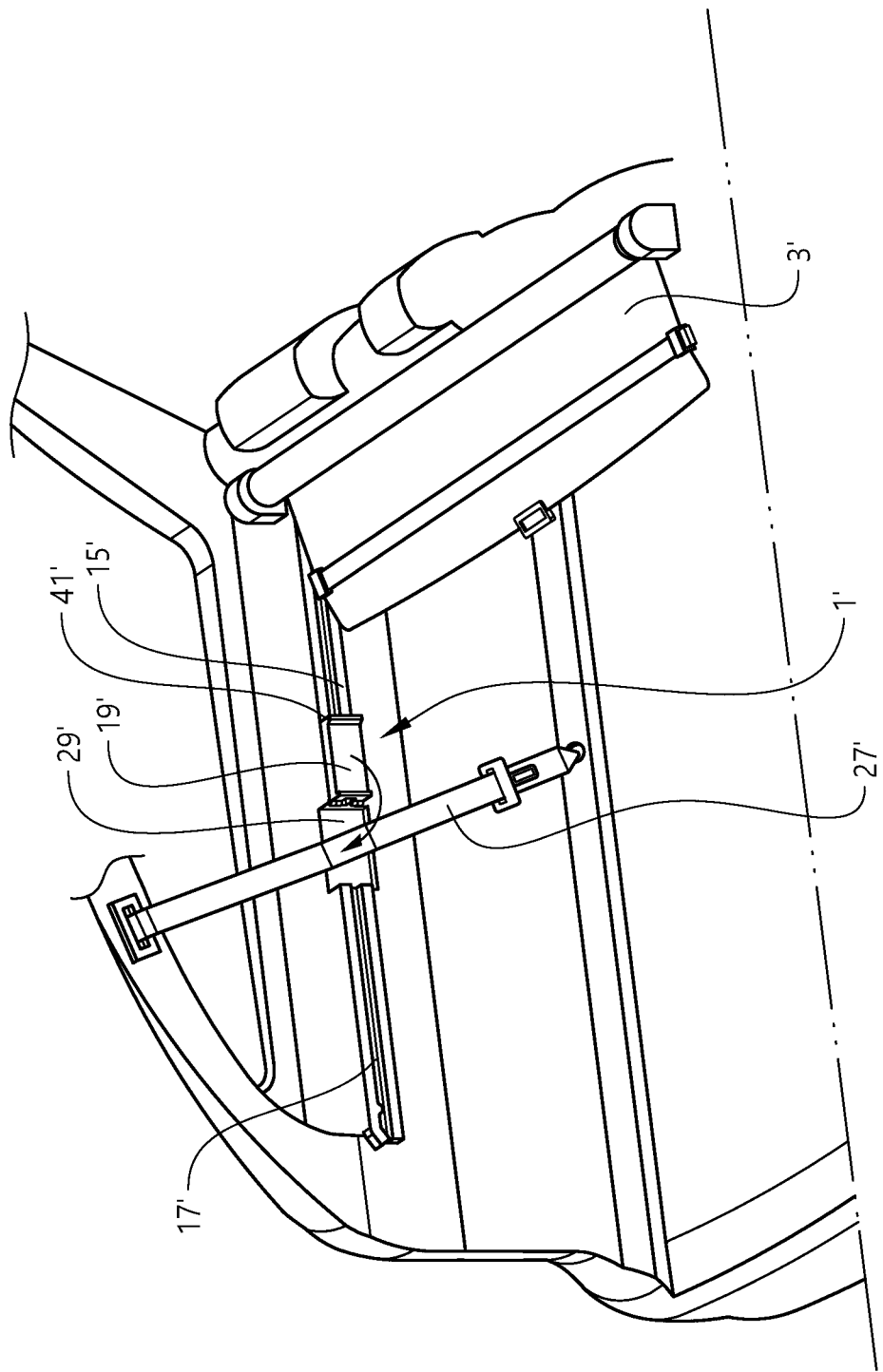
FIG. 4 illustrates a guide rail arrangement according to a second embodiment of the invention with a guide member in an idle position.
Figure 5:
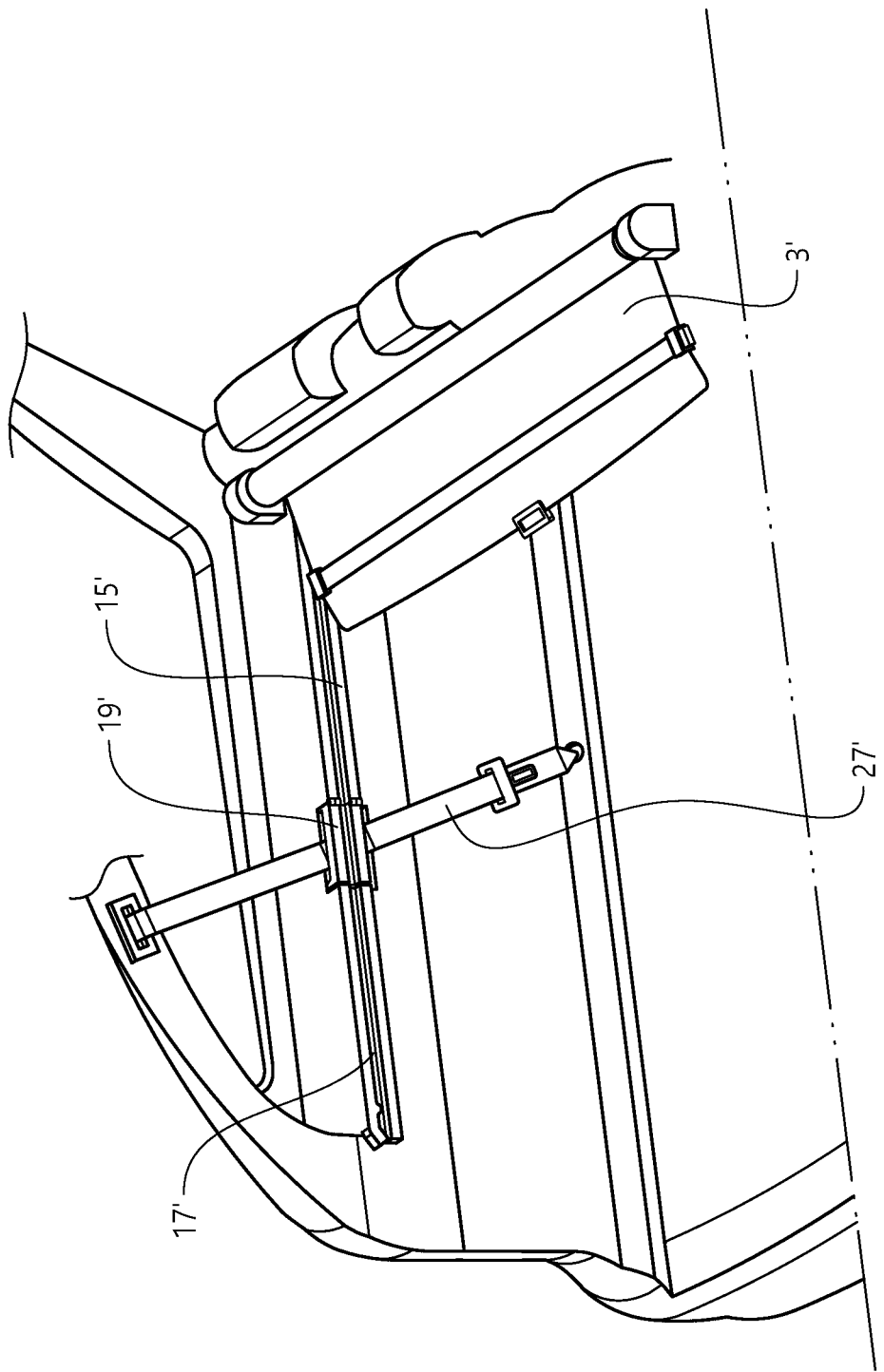
FIG. 5 illustrates the guide rail arrangement of FIG. 4 with the guide member in an operational position.

FIGS. 4-5 illustrate a guide rail arrangement 1' for an extensible load cover 3' according to a second embodiment of the invention. Most details and components are similar as for the first embodiment described above in conjunction with FIGS. 1-3 and will not be described again.

The guide rail arrangement 1' comprises a guide rail 15', an additional guide rail 17' and a guide member 19'. However, the guide member 19' of the second embodiment differs from that of the first embodiment by being displaceable by rotation from the idle position, see FIG. 4, to the operational position, see FIG. 5, and back again to the idle position, as is indicated by the curved arrow of FIG. 4.

During the rotation, the guide member 19' pushes a belt 27' into an indentation 29' adapted to receive the belt 27'. In the operational position, the guide member 19' covers the belt 27', such that the guide member 19' in the operational position forms an extension of the guide rail 15' and the additional guide rail 17' in a corresponding way as for the first embodiment, cf. FIGS. 2 and 5.

Figure 6:
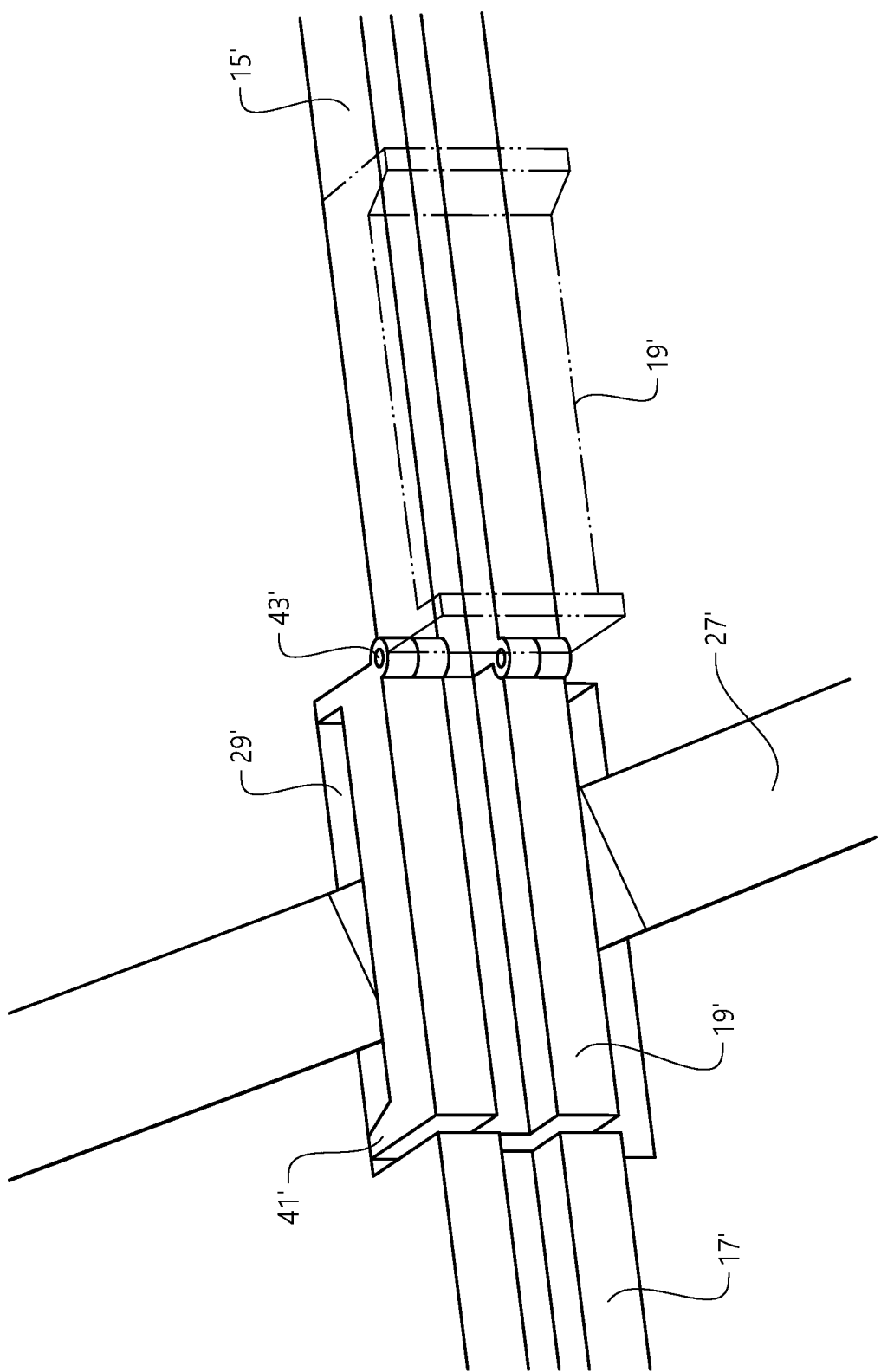
FIG. 6 is a detailed view of FIG. 5 showing the guide member.

In order to facilitate the pushing of the belt 27' into the indentation 29', the rear side of the guide member 19' may as an option, indicated in FIGS. 4 and 5 and better seen in the detailed view of FIG. 6, comprise a belt catch member 41', e.g. a protrusion 41', as is illustrated, or a high-friction zone, which prevents the belt 27' from sliding against the rear side of the guide member 19', once the belt 27' has been caught by the belt catch member 41'. Hence, it is ascertained that the belt 27' follows the rotational movement of the guide member 19'.

FIG. 6 also shows the axis 43', around which the guide member 19' rotates. The axis 43' may be comprised in the guide member 19' or form a separate component attached to the guide member 19'.

Figure 7:
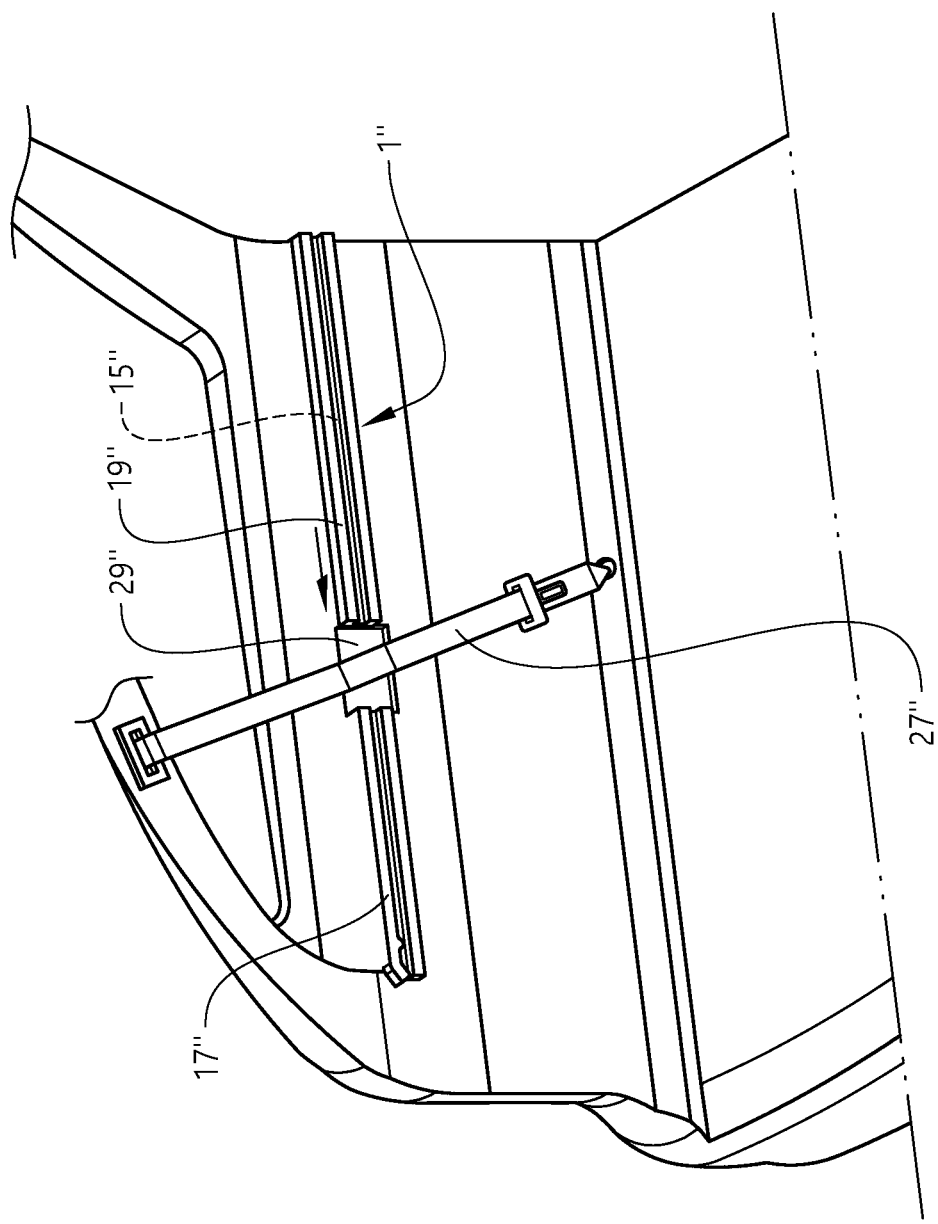
FIG. 7 illustrates a guide rail arrangement according to a third embodiment of the invention with a guide member in an idle position.
Figure 8:
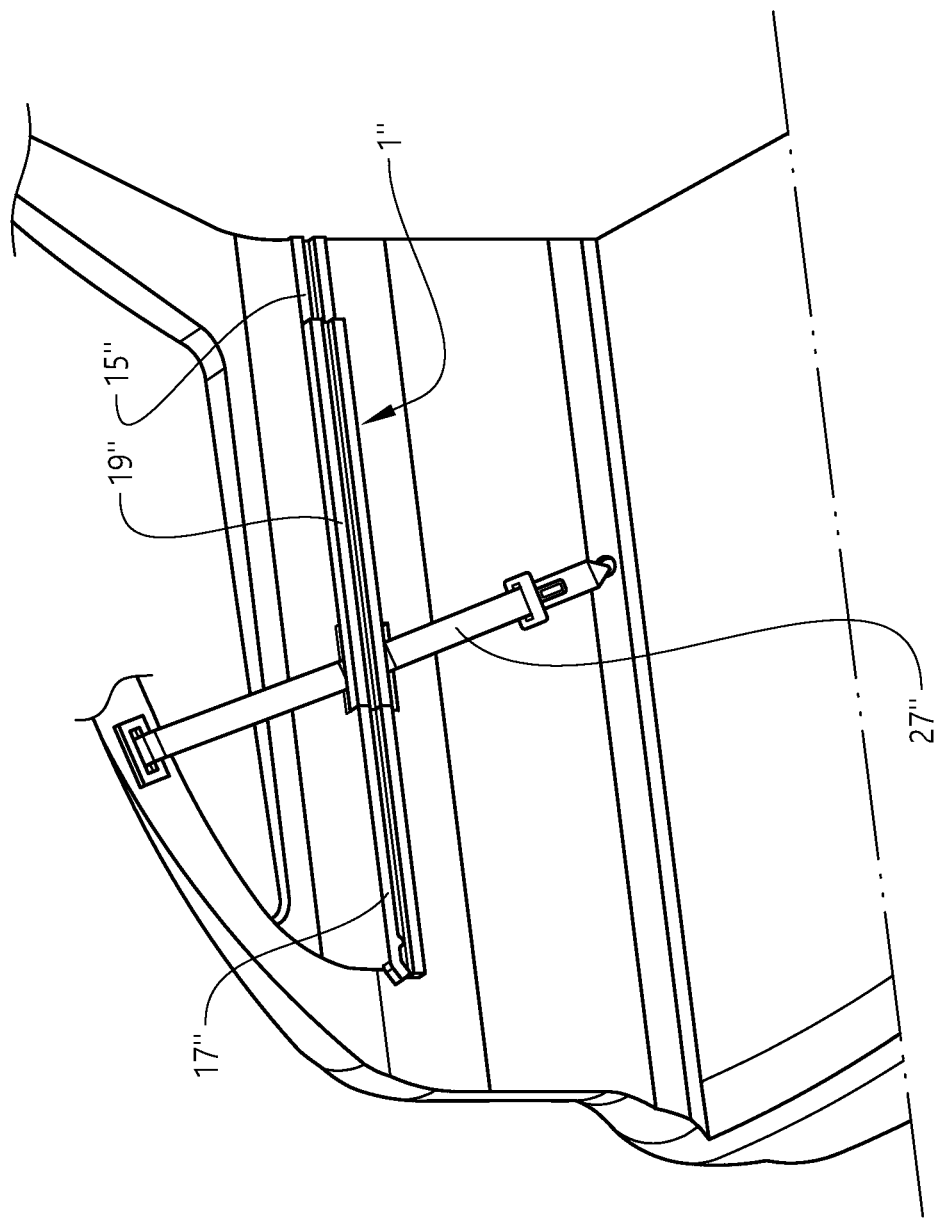
FIG. 8 illustrates the guide rail arrangement of FIG. 7 with the guide member in an operational position.

FIGS. 7-8 illustrate a guide rail arrangement 1'' for an extensible load cover according to a third embodiment of the invention. Many details and components are similar as for the first embodiment described above in conjunction with FIGS. 1-3 and will not be described again. However, this embodiment differs from the first and second embodiments by the guide member 19'' being much longer in the main extension direction D than for the first and second embodiments. In the third embodiment, the guide member 19'' is typically longer than 15 cm, 20 cm or 30 cm in the main extension direction D. As an option, illustrated in FIGS. 7-8, the guide member 19'' is as long as the guide rail 15''.

The guide member 19'' is displaceable in relation to the guide rail 15'' by sliding. In the idle position, see FIG. 7, the guide member 19'' is located on top of the guide rail 15'', which corresponds to laterally side by side when mounted in the vehicle. In order to reach the operational position, the guide member 19'' is slid along the guide rail 15'', such that in the operational position, the guide member 19'' covers the indentation 29'' and the belt 27'' and also a part of the guide rail 15'', see FIG. 8. The guide member 19'' may also be slid further rearwards in the vehicle, such that the guide member 19'' covers a part of the optional additional guide rail 17''.

As an alternative or a complement, the guide member 19'' may be located on top of the optional additional guide rail 17'' in the idle position and be slid forwards in the vehicle to reach the operational position, in which the guide member 19'' covers the indentation 29'' and the belt 27''.

Figure 9:
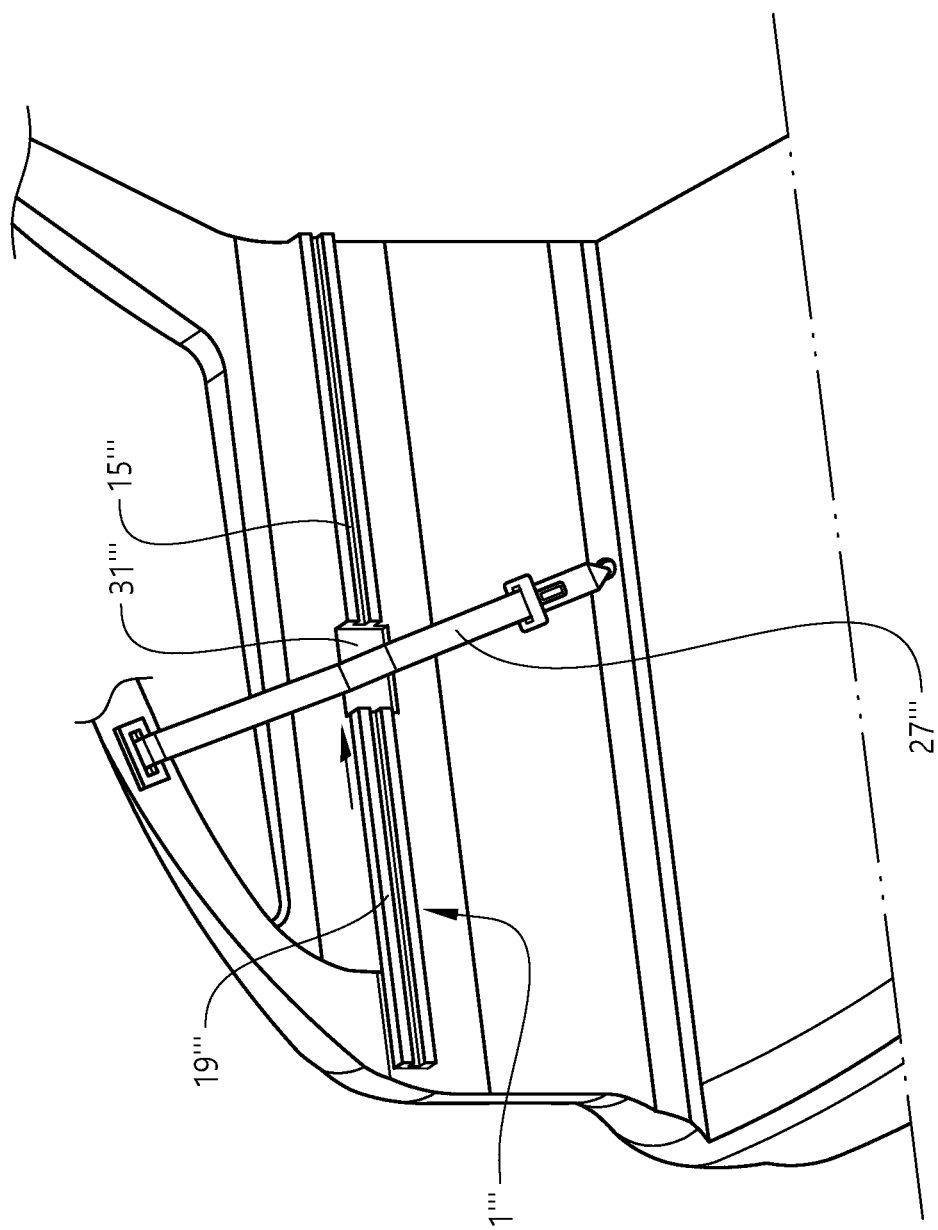
FIG. 9 illustrates a guide rail arrangement according to a fourth embodiment of the invention with a guide member in an idle position.
Figure 10:
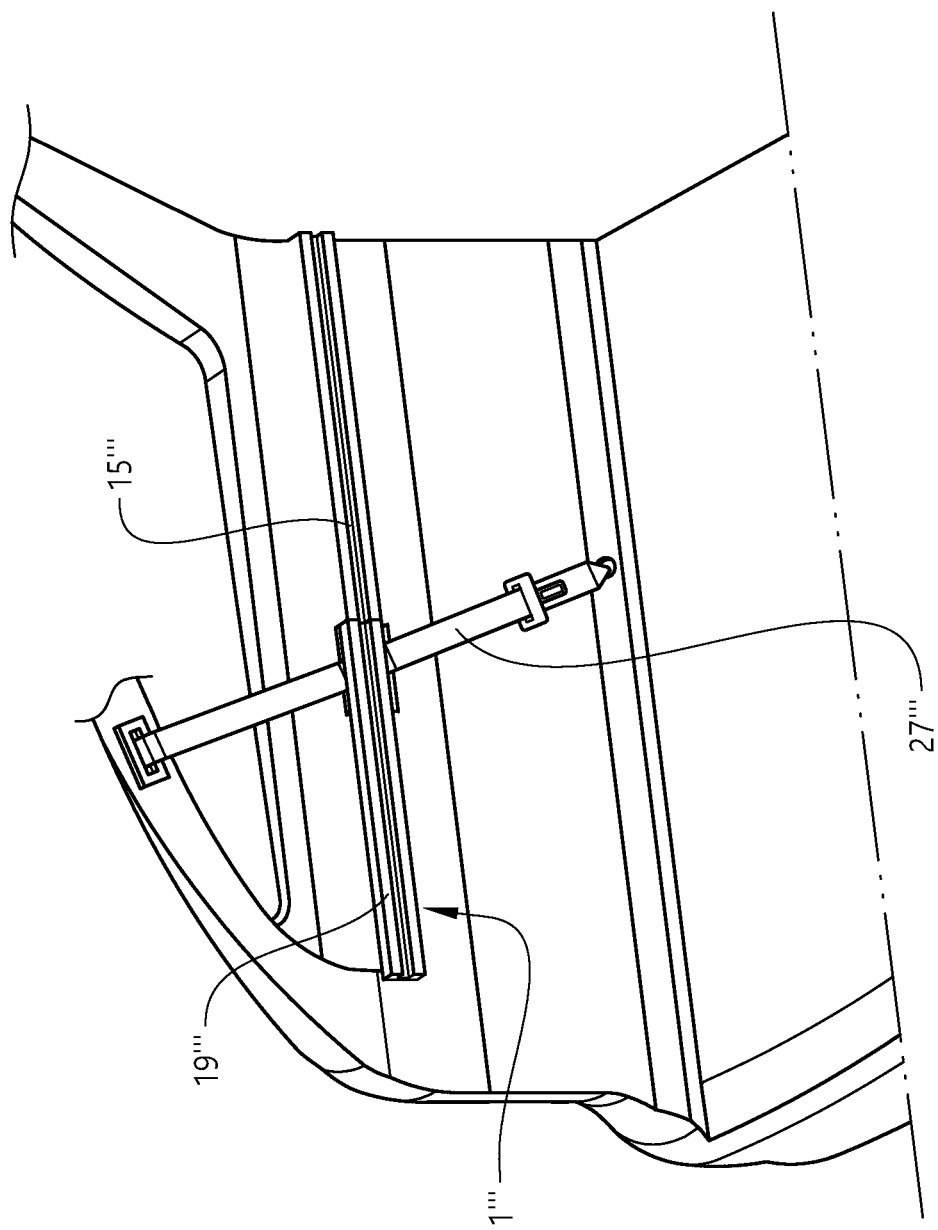
FIG. 10 illustrates the guide rail arrangement of FIG. 9 with the guide member in an operational position.

As another alternative embodiment, the guide member and the additional guide rail may be formed as an integral component 19''', which is displaceable as a whole to reach the operational position, see the fourth embodiment in FIGS. 9-10. The integral component may in that case be regarded as a long guide member 19'''. When in the idle position, see FIG. 9, the above-mentioned interspace 31''' is formed between the guide rail 15''' and the integral component 19'''. In the operational position, the integral component 19''' at least partly covers the interspace 31''' and the belt 27''', e.g. by having been slid over the interspace 31''', see FIG. 10. The integral component 19''' may e.g. slide in a slot in the side trim panel.

Figure 11:
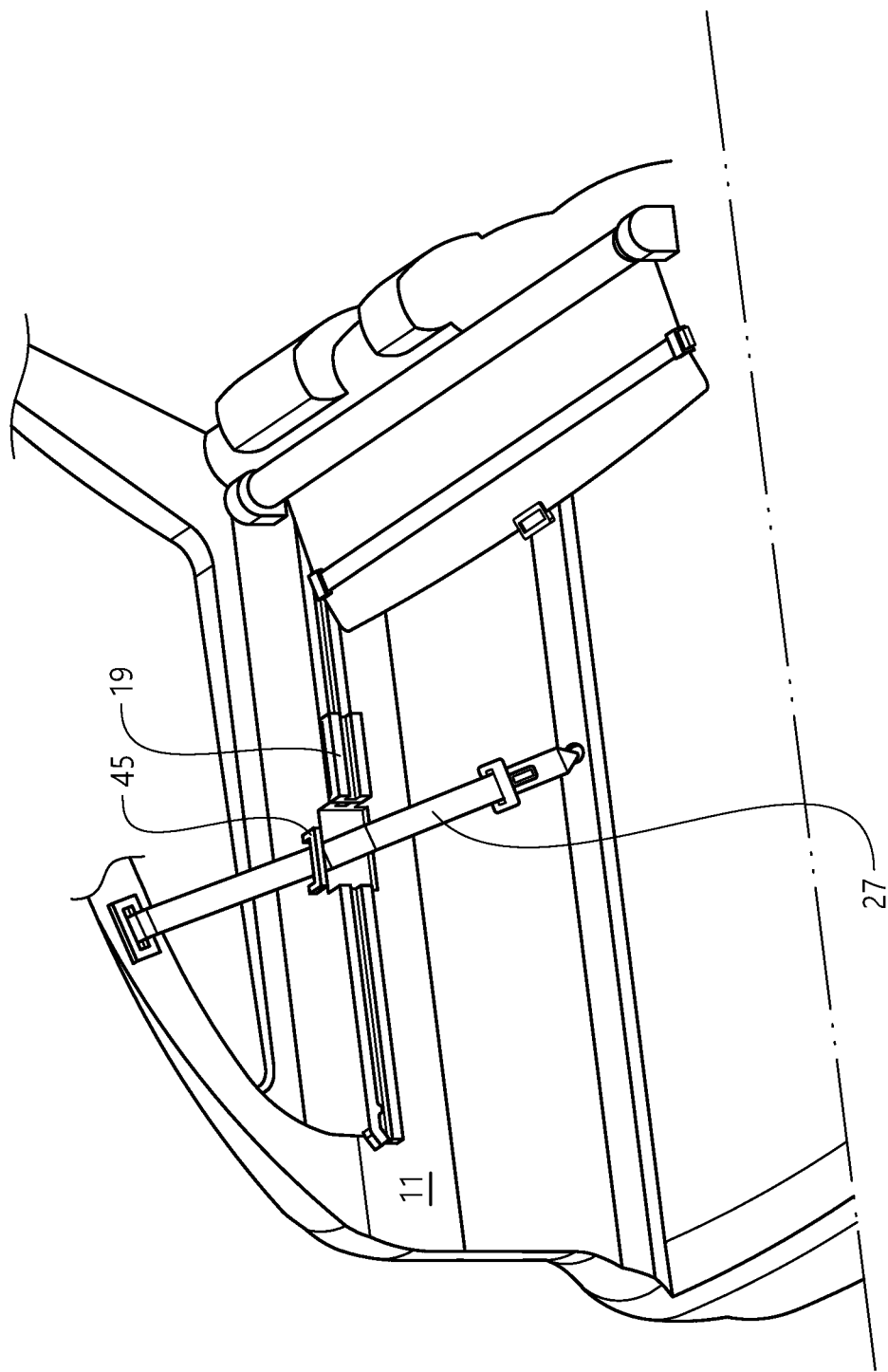
FIG. 11 illustrates a side trim panel with a belt retaining member.

If the belt 27 is positioned in an unfavourable position when the load cover 3 is to be pulled out, e.g. interspaced from the side trim panel 11 of the vehicle, it may be advantageous to use a belt retaining member 45 like the one illustrated in FIG. 11 to retain the belt 27 in a suitable position, while the guide member 19 is displaced to the operational position. In particular, this may be advantageous for embodiments in which the guide member is slid during the displacement to the operational position, such as for the first, third and fourth embodiments described herein or if the belt is too far away from the rotating guide member 19' of the second embodiment.

The belt retaining member 45 may be rotatably attached to the side trim panel 11 and operate in a similar way as the belt catch member 41' described herein. As an alternative or a complement, the belt retaining member may be releasably attached and re-attachable to the side trim panel 11, e.g. by means of a snap-in function.

Further modifications of the invention within the scope of the appended claims are feasible. As such, the present invention should not be considered as limited by the embodiments and figures described herein. Rather, the full scope of the invention should be determined by the appended claims, with reference to the description and drawings.

Although FIGS. 1-11 show only one lateral side of the vehicle luggage compartment, the skilled person understands that there is typically a similar guide rail arrangement at the other lateral side of the vehicle luggage compartment.

Further, although the illustrated embodiments disclose load covers of a luggage compartment in a vehicle, the skilled person understands that the cover may be adapted to cover any case of space. Thereby the cover may be opaque or at least partly transparent. The cover may comprise a fabric and/or a net.

The invention claimed is:

1. A guide rail arrangement for an extensible cover, said rail arrangement having a main extension direction (D), said guide rail arrangement comprising:
   a guide rail, adapted to guide said cover during pull-out thereof, said guide rail extending in said main extension direction (D),
   a guide member, being displaceable in relation to said guide rail and being configured to form an extension of said guide rail in said main extension direction (D), when in an operational position in relation to said guide rail,
   a side trim panel, said guide rail being comprised in said side trim panel or forming a part of said side trim panel or said side trim panel comprising a slot adapted to receive and hold said guide rail, said side trim panel comprising an indentation, said indentation being located next to said guide rail, such that said guide member in said operational position at least partly covers said indentation, and a belt, wherein said indentation is configured such that when said belt is placed in said indentation, said guide member in said operational position at least partly covers said belt.

2. The guide rail arrangement according to claim 1, wherein said guide member is displaceable in relation to said guide rail to said operational position from an idle position, in which said guide member is located at said guide rail in an at least partly overlapping position.

3. The guide rail arrangement according to claim 1, wherein said guide rail comprises a track intended to receive a protruding member of said cover, said guide member comprising a corresponding track, such that said guide rail and said guide member are configured to, in said operational position, form a combined track.

4. The guide rail arrangement according to claim 1, wherein said guide member is slidably displaceable along said guide rail to said operational position.

5. The guide rail arrangement according to claim 1, wherein said guide member is rotatably displaceable in relation to said guide rail to said operational position.

6. The guide rail arrangement according to claim 1, wherein said guide member comprises a belt catch member, adapted to catch and retain said belt.

7. The guide rail arrangement according to claim 1, wherein said guide member has an extension, as seen in said main extension direction (D), in the range of from 2 cm to 30 cm.

8. The guide rail arrangement according to claim 2, wherein said guide member is biased to said idle position.

9. The guide rail arrangement according to claim 1 further comprising an additional guide rail, also extending in said main extension direction (D), such that said additional guide rail is aligned with said guide rail with an interspace therebetween, said guide member in said operational position being located between said additional guide rail and said guide rail, such that said guide member at least partly fills or covers said interspace to form an extension of said guide rail and said additional guide rail in said main extension direction (D).

10. The guide rail arrangement according to claim 9, wherein said guide member in said operational position fits into said interspace.

11. The guide rail arrangement according to claim 1, wherein said guide rail arrangement further comprises a displacement means adapted to displace said guide member to said operational position.

12. A method of pulling out said extensible cover of said vehicle, said vehicle comprising said guide rail arrangement according to claim 1 and said cover, said cover comprising a protruding member configured to be moved in said guide rail arrangement while said cover is pulled out, said method comprising:
    a) placing said belt in said indentation,
    b) displacing said guide member to said operational position, and
    c) pulling out said cover, such that said protruding member moves in said guide rail and in said guide member, respectively.

13. The method according to claim 12, in case wherein said guide member comprises a belt catch member, adapted to catch and retain said belt, wherein step a) comprises:
    catching said belt by means of said belt catch member in order to move said belt into said indentation.

14. The guide rail arrangement according to claim 1, wherein said extensible cover is a load cover.

15. The guide rail arrangement according to claim 1, wherein said guide rail comprises a track intended to receive a protruding member of said cover, said guide member comprising a corresponding track, such that said guide rail and said guide member are configured to, in said operational position, form a continuous combined track.

16. The guide rail arrangement according to claim 2, wherein said guide member is slidably displaceable along said guide rail between said idle position and said operational position.

17. The guide rail arrangement according to claim 2, wherein said guide member is rotatably displaceable in relation to said guide rail between said idle position and said operational position.

18. The guide rail arrangement according to claim 6, wherein said belt comprises a safety belt.

19. The guide rail arrangement according to claim 1, wherein said side trim panel is an upper side trim panel.

* * * * *